United States Patent [19]

Close

[11] 4,400,482

[45] * Aug. 23, 1983

[54] NOVEL FLUOROELASTOMER FILM COMPOSITIONS CONTAINING SILANE COMPOUNDS AND METHOD FOR THE PREPARATION THEREOF

[75] Inventor: Donald Close, Stow, Ohio

[73] Assignee: David Hudson, Inc., Stow, Ohio

[*] Notice: The portion of the term of this patent subsequent to Apr. 6, 1999 has been disclaimed.

[21] Appl. No.: 359,361

[22] Filed: Mar. 18, 1982

Related U.S. Application Data

[63] Continuation of Ser. No. 178,788, Aug. 18, 1980, Pat. No. 4,323,603.

[51] Int. Cl.$^3$ .............................................. B05D 3/02
[52] U.S. Cl. .................................. 524/114; 156/326; 427/387; 427/388.5; 427/389.8; 427/393.5; 427/407.1; 427/407.2; 427/389.7; 524/188
[58] Field of Search ...................... 427/387, 386, 388.5, 427/389.1, 389.8, 393.5, 407.1, 407.2; 525/104; 524/545, 546, 114, 188; 156/326

[56] References Cited

U.S. PATENT DOCUMENTS

| | | | |
|---|---|---|---|
| 2,979,418 | 4/1961 | Dipner | 117/72 |
| 3,379,607 | 4/1968 | Foster, et al. | 161/207 |
| 4,143,204 | 3/1979 | Fang | 428/413 |

FOREIGN PATENT DOCUMENTS 2141879  3/1973  Fed. Rep. of Germany ...... 525/342

OTHER PUBLICATIONS

Bowman, "Solution Coatings of Viton" (duPont Viton Bulletin No. 16, 1966).

Hackett, "Adhering 'Viton' to Metal During Vulcanization" duPont VITON Report VT-450.1.
Alexander, "A Capsule View of the A, B and E Types of 'VITON'" duPont VITON Report VT-000.1 (RZ).
Arnold, Barney and Thompson, *Rubber Chemistry and Technology*, "Fluoroelastomers" *619-653*.

*Primary Examiner*—John D. Smith
*Assistant Examiner*—Thurman K. Page
*Attorney, Agent, or Firm*—Hamilton, Renner & Kenner

[57] ABSTRACT

The invention herein disclosed provides a method for preparing improved fluoroelastomer film compositions including the steps of dissolving a fluoroelastomer gum selected from the group consisting of copolymers of vinylidene fluoride and hexafluoropropylene, and terpolymers of vinylidene fluoride, hexafluoropropylene and tetrafluoroethylene in a solvent, adding a silane compound to the gum solution and curing the fluoroelastomer gum with a silane in the absence of metallic oxides. A method is also provided for adhering fluoroelastomer film compositions, devoid of metallic oxides, to substrates which includes the steps of dissolving the fluoroelastomer gum in a solvent, adding a silane compound to the gum solution, coating the substrate with the fluoroelastomer gum-silane solution, evaporating the solvent and leaving a film firmly adhered to the substrate. Another method includes the steps of first coating a substrate with a silane compound, then applying a fluoroelastomer gum solution over the silane coated substrate, evaporating the solvent and leaving a film firmly adhered to the substrate. The fluoroelastomer film compositions disclosed herein are also novel and can be used to coat a variety of substrates thereby providing other novel, useful articles.

13 Claims, No Drawings

NOVEL FLUOROELASTOMER FILM COMPOSITIONS CONTAINING SILANE COMPOUNDS AND METHOD FOR THE PREPARATION THEREOF

This application is a continuation of application Ser. No. 178,788, filed Aug. 18, 1980, now U.S. Pat. No. 4,323,603.

TECHNICAL FIELD

The present invention is directed toward novel fluoroelastomer film compositions, which compositions exhibit greatly improved adhesion with a variety of substrate materials. A method for preparing the fluoroelastomer films and for improving the adhesion between these films and various substrates is also set forth. A number of useful articles can be obtained by applying a coating or envelope of the fluoroelastomer film compositions of the present invention.

Fluorocarbon elastomers comprise copolymers of vinylidene fluoride and hexafluoropropylene, known since about 1956, and terpolymers of vinylidene fluoride, hexafluoropropylene and tetrafluoroethylene, known since about 1958. Generally, these compositions exhibit a resistance to heat, aliphatic and aromatic hydrocarbons, chlorinated solvents, petroleum fluids and many mineral acids. Although not universally resistant to solvents or chemicals, their resistance to such compounds is superior to most other elastomers. They can be processed with existing technology and apparatus into solid or solid walled articles, however, given their relatively high cost, use of fluoroelastomers has been somewhat curtailed and directed more to specialty applications.

BACKGROUND ART

Known fluoroelastomer compositions comprise the fluorocarbon elastomer or gum, a metal oxide, a filler, curing agents and processing aids. Converting the rubbery raw gum fluoroelastomer to vulcanizates requires primary crosslinking or curing agents such as the amines, dithiols, peroxides or certain aromatic polyhydroxy compounds. Alternatively, radiation can be used. With each of these systems a basic metal oxide is required, such as the oxides of magnesium, calcium, lead or zinc, as an acid acceptor. Fillers are employed for their usual purposes those being to reinforce the elastomer and reduce cost. Processing aids are also employed for conventional purposes.

To compound a fluoroelastomer for coating purposes, it is customary to mix the gum with a desired filler and a metallic oxide on a mill, working the additives well into the gum. After removal from the mill, a solvent such as a low molecular weight ester or ketone is added followed by an aliphatic amine. The amine initiates curing which requires that the composition be utilized within several hours.

In another curing system, a ketimine is added to the foregoing mill mix with the solvent. The resulting mixture is relatively stable so long as moisture is not present. Ketimines are also utilized to cure epoxy resins and in the presence of moisture from the air or otherwise, break down to form an amine and a ketone. Once the amine has been released, the fluoroelastomer begins to cure, providing a working life of several hours.

Yet another system includes the addition of the curative with the gum, filler and metallic oxide on the mill. Curatives such as hexamethylene diamine carbamate, ethylene diamine carbamate or dicinnamylidene-1,6-hexanediamine, commonly referred to as the DIAK's, are used. Care must be exercised that the temperature on the mill does not rise too high in order to avoid premature curing. The resulting mixture can then be processed on conventional apparatus or it can be mixed with a solvent to be used for coating work. Heat completes the final cure in this system as it also does with the preceding systems.

When used as a coating, several problems exist. A primary one is adhesion; pretreatment of the substrate is required including cleaning and priming operations. Another problem is that settling of the metallic oxide will occur during use of the coating material, giving a nonuniform dispersion of the metallic oxide and nonuniform cure. Working life is usually relatively low requiring the manufacturer to compound the fluoroelastomer and use it the same day, often within hours. Use of ketimines, for instance, necessitates airless spraying and closed dipping tank systems in order to avoid premature curing prior to the application. Where solvents are not employed, for production of solid products, mill mixing rarely results in homogeneous mixtures of the metallic oxide and curative such as DIAK, throughout the gum.

The foregoing fluoroelastomer systems typify the state of the art and although the compositions have been utilized to form solid products as well as coated products, use as a coating has had its shortcomings. Coatings obviously provide a fluoroelastomer surface without the expense of the entire article being a fluoroelastomer. In other instances, where size, strength or location of the article militates against solid elastomer construction, a coating is the only manner in which the fluoroelastomer can e employed.

Of the systems and techniques known to me, none has provided a composition readily adherable to a plurality of substrates, providing an abrasion resistant coating and without loss of the inherent chemical resistance possessed by the fluoroelastomer. Ideally, a thinner film, on the order of one or more mils (0.025 mm) thickness, that could adhere to a variety of substrates or envelop them, would enable fluoroelastomers to be used in applications where heretofore they have been unfit due either to high costs or poor adhesion.

DISCLOSURE OF THE INVENTION

It is therefore an object of the present invention to provide a novel fluoroelastomer film composition that adheres well to a variety of substrates such as plastics, rubbers, metals, glass, fabrics, fiberglass, wood, paper and the like, is relatively abrasion free and provides a good protection against chemical, fuel and solvent attack.

It is another object of the present invention to provide a method for preparing improved fluoroelastomer film compositions.

It is yet another object of the present invention to provide a method for adhering fluoroelastomer film compositions to substrates.

It is a further object of the present invention to provide a novel fluoroelastomer film composition, as described hereinabove, that is devoid of metallic oxides.

It is still a further object of the present invention to provide methods, as described hereinabove, that do not require the step of milling or otherwise physically adding metallic oxides to the fluoroelastomer composition.

It is still another object of the present invention to provide methods, as described hereinabove, which employ silane compounds to cure the fluoroelastomer.

These and other objects, together with the advantages thereof over the prior art, which shall become apparent from the specification which follows are accomplished by my invention as hereinafter described and claimed.

In general, the method for preparing improved fluoroelastomer film compositions, according to the present invention, includes the steps of dissolving a fluoroelastomer gum selected from the group consisting of copolymers of vinylidene fluoride and hexafluoropropylene, and terpolymers of vinylidene fluoride, hexafluoropropylene and tetrafluoroethylene in a solvent, adding a silane compound to the gum solution and curing the fluoroelastomer gum with the silane in the absence of metallic oxides.

A method is also provided for adhering fluoroelastomer film compositions, devoid of metallic oxides, to substrates which includes the steps of dissolving a fluoroelastomer gum selected from the group consisting of copolymers of vinylidene fluoride and hexafluoropropylene, and terpolymers of vinylidene fluoride, hexafluoropropylene and tetrafluoroethylene in a solvent, adding a silane compound to the gum solution, coating the substrate with the fluoroelastomer gum-silane solution, evaporating the solvent and leaving a film firmly adhered to the substrate.

Another method provides for adhering and curing a fluoroelastomer film to a substrate which includes the steps of coating a silane compound onto a desired substrate; applying a fluoroelastomer gum solution directly over the coated substrate, evaporating the solvent from the gum solution and leaving a film firmly adhered to the substrate. Lastly, the present invention provides for a novel fluoroelastomer cured film composition which is dense and impermeable and comprises a fluoroelastomer gum and a silane compound.

The methods of the present invention principally allow a fluoroelastomer composition, as a film coating, to adhere to a variety of substrates which they have not adhered to well, if at all, heretofore. The film coatings need not be cured with conventional curing agents commonly employed with fluoroelastomers, epoxies and other polymers. Unlike existing systems, the methods of the present invention are directed toward deleting metallic oxides from the composition and, by so doing, it has been found that adhesion to substrates is greatly improved. The preferred embodiments which follow shall establish the increase in adhesive properties utilizing various silane compounds and the fact that these compounds will cure the fluoroelastomer. Control compounds without silane compounds will demonstrate the lack of adhesion which characterizes existing technology.

PREFERRED MODE FOR CARRYING OUT THE INVENTION

Fluorocarbon elastomers utilized in the practice of the present invention include the copolymers of vinylidene fluoride and hexafluoropropylene and the terpolymers of vinylidene fluoride, hexafluoropropylene and tetrafluoroethylene. Fluorocarbon elastomers such as these are commercially available as the Viton brand and Fluorel brand fluoroelastomers. Viton is a registered trademark of E. I. duPont de Nemours & Co. and Fluorel is a registered trademark of 3M Company. Experimental work conducted and reported herein has been with the Viton series specifically including two of the polymers listed in Table I.

TABLE I

| | |
|---|---|
| Viton A | Copolymer of vinylidene fluoride and hexafluoropropylene |
| Viton A-35 | Low viscosity analog of Viton A |
| Viton B | Terpolymer of vinylidene fluoride, hexafluoropropylene and tetrafluoroethylene |
| Viton B-50 | Low viscosity analog of Viton B |
| Viton E-60 | Copolymer of vinylidene fluoride and hexafluoropropylene with broad molecular weight distribution |
| Viton C-10 | Very low viscosity version of Viton A |
| Viton VTR-5362 | A terpolymer of proprietary composition |

Although not exemplified herein, the present invention could as well be practiced with the other Viton elastomers or the Fluorel elastomers available from 3M.

Compositions of the present invention comprise a gum fluoroelastomer and a silane compound and are devoid of metallic oxides. In order to demonstrate practice of the present invention different Viton series polymers have been employed and while not every example has been repeated with each of the seven polymers presented in Table I, it is to be understood that substitutions of one particular polymer for another can be made by those skilled in the art according to the properties characterizing a specific series which properties are desired in the invention composition.

An important aspect of the present invention is that the inherent resistance of the fluorocarbon elastomers to many fuels, hydrocarbons and solvents is not sacrificed to gain the improved adhesion set forth herein. On the contrary, the usefulness of the fluorocarbon elastomers comprising the invention composition will be seen to increase, due to the adhesive properties imparted to the latter. Inasmuch as existing fluorocarbon elastomer compositions have not adhered well, if at all, to very many substrates, the compositions and method set forth herein will provide the ability to coat or envelop these substrates for the first time, providing new and useful products.

Additionally, many of the problems attendant existing curative systems including short working life or shelf life or sensitivity to moisture, can be avoided by utilizing a silane compound rather than an amine-containing compound as a curative compound. Moreover, according to one of the methods of the present invention, the silane compound can be employed as a coating for a substrate to which can subsequently be applied a coating of the fluoroelastomer. In this manner, the fluoroelastomer cannot cure until brought into contact with the silane coating. Hence, shelf and working lives are not a factor, nor are sensitivities to moisture, heat or aging.

The silane compounds utilized in the practice of the present invention can be represented by the general formula $RCH_2CH_2CH_2SiR'_{3-n}(OR'')_n$ where R is a reactive organofunctional group such as amino or epoxy, R' is a simple alkyl group having about one to five carbon atoms, OR'' is a hydrolyzable alkoxy group, R'' being an alkyl group having about one to four carbon atoms and $n$ is 1, 2 or 3. Silanes such as these are commercially available from Dow Corning Corporation. Technical data from Dow Corning establishes that the silanes generally carry the methoxysilane group, which hydrolyzes in a combination of water and acid or base catalyst, and an organofunctional group tailored to match the reactivity of the system in which it will be used. Those groups useful in the practice of the present invention include amino and epoxy. Experimental work conducted and reported herein has been with Dow Corning Corporation's silanes, specifically including two of the silanes set forth in Table II.

TABLE II

| Silane | Formula | Solution pH |
|---|---|---|
| Z-6020 | $H_2N(CH_2)_2HN(CH_2)_3Si(OCH_3)_3$ | 10 |
| Z-2-2023 | $H_2N(CH_2)_2HNCH_2CH(CH_3)CH_2Si(OCH_3)_2$<br>$\quad\quad\quad\quad\quad\quad\quad\quad\quad\quad\quad\quad |$<br>$\quad\quad\quad\quad\quad\quad\quad\quad\quad\quad\quad\quad CH_3$ | 10 |
| Z-6040 | $\underset{CH_2CHCH_2O(CH_2)_3Si(OCH_3)_3}{\overset{O}{\triangle}}$ | 3-5 |

The amount of silane employed is from about 0.1 to about 10 parts by weight based upon 100 parts of the fluoroelastomer, hereinafter abbreviated phr. The foregoing range is an operable range; experimental work herein has indicated the optimal range for either silane falls within this broader range. As a general rule, the lower the amount of silane employed, the greater will be the cure time for the fluoroelastomer, as can be determined by measuring the gel time of fluoroelastomer-silane solutions.

Preparation of the composition according to one method of the present invention requires first that the fluoroelastomer be put into solution with a typical solvent such as methylethyl ketone (MEK), acetone, ethyl acetate, tetrahydrofuran and the like. Next is added the silane also as a solution in one of the foregoing solvents. Most components are mixed for a period of time of from about five to about 15 minutes at room temperature and then applied to the desired substrate. Once the fluoroelastomer and silane have been combined, the system begins its cure, which can be controlled by the amount of silane added.

According to another method of the present invention, a topcoat of the fluoroelastomer gum solution can be applied directly over the silane primer coating and adhesion between the fluoroelastomer and underlying substrate will be obtained. The advantage of the two layer system is in the fact that no curative is present in the fluoroelastomer solution thereby avoiding the usual fixed time working life conditions inherent fluoroelastomer compositions containing a curative. Of course, where these would not present a problem or it is desirable to dispense with a primer coating, the first method can be followed, in which instance the silane begins to provide the cure immediately.

It is important to note that the composition of the present invention does not require the presence of metallic oxides. In fact, for satisfactory adhesion to various substrates better results are obtained when the metallic oxide is omitted. Deletion of the metallic oxide from the composition of the present invention is clearly contrary to the present understanding of the art which teaches that the metallic oxide is necessary to provide acid acceptors in the curing reaction.

With respect to fillers, such as carbon black or mineral fillers generally, their presence or absence from the composition does not appear to affect the cure or the improved adhesive properties. Inasmuch as the composition of the present invention does not require the presence of a filler, either to assist curing or to improve adhesion, unless a filler is otherwise desired, it can be omitted.

The fluoroelastomer composition prepared according to the foregoing process can be used to form coatings, envelopes around other articles, films and the like. When used as a coating or envelope, the underlying support material or substrate is given the protection inherent fluoroelastomers. Moreover, the coating or envelope is generally abrasion resistant and most importantly has a very high degree of adhesion to many substrates which in itself is a major advantage of the present invention.

Fluoroelastomer compositions of the present invention, cured in the absence of metallic oxides, have been tested by coating metal including aluminum and steel, glass, EPDM and nitrile rubber and prepreg, a resin-curative impregnated fiberglass laminate. The solution of the composition can be poured onto or over the substrate. The substrate can be coated via brush, roller, dip, spray or other known techniques for applying solvent coatings. The coated articles have been subjected to a variety of tests to determine the adhesion between fluoroelastomer and substrate and the resistance of the fluoroelastomer to various environments. A more detailed explanation regarding testing is provided with the examples hereinbelow.

EXAMPLES

In the examples which follow, Viton 5362 and Viton B were employed with two different silane compounds. In each instance, the Viton gum was first put into solution with methylethyl ketone to form a 20% solution by weight unless otherwise noted. The silane was next put into methylethyl ketone solution at 20% by weight. Respective amounts of the fluoroelastomer and silane solutions mixed together have been set forth in Table III, all parts being listed by weight. Given 20% total solids contents for the solutions, the phr of silane employed is the same number as appears in the table for Examples 5-8 and four times the amount reported for Examples 1-4. Two DuPont formulations were also prepared, as Control A and B, which were utilized in adhesion, gasohol immersion tests and acid environment tests for comparison with the compositions of the present invention. Neither control formulation constitutes the invention claimed herein but rather is to be taken as the state of existing fluoroelastomer technology. The formulation for each is contained in Table IV; all parts being phr.

TABLE III

Formulation of Viton Compositions with Silanes

| Ex. No. | Viton 5362 | Viton B | Amino Silane Z6020 | Epoxy Silane Z6040 | Gel times (hrs.) |
|---|---|---|---|---|---|
| 1 | 25 | — | 1.25 | — | 16 |
| 2 | — | 25 | — | 1.25 | 27 |
| 3 | 25 | — | 2 | 1 | (a) |
| 4 | 25 | — | 2 | 1 | 72 |
| 5 | 100 | — | — | 1 | 8 wks. |
| 6 | 100 | — | 1 | — | 24 |
| 7 | 100 | — | 0.5 | — | 8 wks. |
| 8 | — | 100 | 0.5 | — | (a) |

(a) Not determined

TABLE IV

| | Viton B Control Compositions | | | | | |
|---|---|---|---|---|---|---|
| Control | Viton B | Maglite Y[a] | MT Black[b] | DIAK #3[c] | TETA[d] | MEK |
| A | 100[e] | 15 | 15 | 2 | — | 528 |
| B | 100 | 15 | 20 | — | 1 | 540 |

[a]Registered trademark for light magnesium oxide, by Merck & Co., Inc.
[b]Carbon black filler
[c]N,N'—dicinnamylidene-1,6-hexanediamine
[d]Triethylenetetramine
[e]Viton B-50 used, low viscosity analog of Viton B In the tests which are reported hereinbelow, a determination of excellent adhesion was made when the film could only be scraped from the substrate with great difficulty with destruction rather than removal of the film. Good adhesion was determined when the film could only be peeled away with difficulty and although scraping was not necessary, the film would stretch beyond its elastic limit and tear. Anything less would readily pull away from the substrate which was poor and unsatisfactory adhesion.

Examples 1 and 2 were poured onto aluminum steel and EPDM test panels. The solvent was evaporated and the film coating was baked for one hour at 149° C. Adhesion between the films and metal substrates was excellent. Examples 1-3 were tested in the same manner on an EPDM panel and all three exhibited excellent adhesion. Next, a 4.5 mil coating on aluminum was formed by pouring 2 gms of the liquid of Example 3 and Control A into aluminum weighing dishes, evaporating the solvent and baking for one hour at 149° C. Each dish was then totally immersed in a jar of gasohol and sealed. Two weeks later, the dishes were removed and the film coating examined. The control film was bubbled and had separated from the dish evidencing no adhesion. The film from Example 3 appeared good and remained adhered to the dish.

Example 4 was used to coat aluminum, glass, EPDM, nitrile rubber and Neoprene and each of the films were baked for 2 hours at 130° C. Adhesion to the aluminum was good; to the glass and EPDM, excellent; and to the nitrile and Neoprene it was fair, being, however, peelable. Gasohol immersion of the aluminum and glass specimens for 14 days resulted in a good film and moderate adhesion to the aluminum substrate and an excellent film and excellent adhesion to the glass substrate. The Control A film, tested in the same manner bubbled and had no adhesion.

Examples 5 and 7 and Control A were used to coat aluminum and glass, the films being baked for three hours at 110° C. and then immersed in gasohol for 14 days. Example 5 and 7 films were found to be good and have good adhesion to the substrates while the Control A film blistered and evidenced no adhesion. Examples 5 and 7 were also cast into aluminum weighing dishes and tested in a nitric acid environment along with a film from Control B. The environment was created by resting the dish within a glass jar, placing several drops of concentrated nitric acid on the coating and sealing the jar with a polyethylene lid. The coating was thus subjected to liquid and vapor acid environments. After eight days the control film was blistered whereas the films from Examples 5 and 7 were no different after five weeks despite repeated additions of nitric acid to make up for evaporation. Unprotected surfaces in all samples were badly corroded by the acid. Example 6 was not subjected to any tests.

Lastly, Example 8 was subjected to separate acid environment tests as described utilizing concentrated nitric and concentrated sulfuric acid. The film from Example 8 was good after four weeks in both acids. The Control B film had blistered after eight days in the nitric acid but was still intact in the sulfuric acid after four weeks.

As stated hereinabove, the fluoroelastomer compositions of the present invention can also be utilized to coat resin impregnated fiberglass laminates. Prepregs are a product of Ferro Corporation, Composites Division used as structural and nonstructural laminates for air frame parts, electrical applications and radomes. Prepregs comprise from 35 to 55% resin, by weight impregnated on fiberglass fabric. The resins can be of the polyester or epoxy type and contain necessary curatives. Once prepared, their stability can be maintained by refrigeration. For use, they are readily cut to size, placed over a form and cured with heat and pressure. Their advantage resides in obviating the steps of first laying up a form of fiberglass fabric followed by the step of resin application prior to curing.

Coating of a prepreg, PE-285, a clear modified diallyl isophthalate resin impregnated fiberglass sheet was conducted as Example 9. The fluoroelastomer coating employed comprised 100 parts of Viton 5362 and 20 parts of MT black, a mixture available from DuPont which was dissolved in MEK to form a 20% solids solution. One-half part of a 20% solution of Z-6020 was also added and the resulting mixture was sprayed over a sheet of the prepreg approximately 15 cm by 30 cm forming a film about five mils thick. The prepreg was then placed in an oven and baked for one hour at 149° C. After cooling, examination revealed that the fluoroelastomer film could not be removed without vigorous scraping.

Although Z-6040 was not tested with a prepreg, nor was a control composition employed, it is believed that the presence of the silane and absence of metallic oxides enabled the fluoroelastomer film to adhere to the cured polyester resin of the prepreg. Inasmuch as the prepreg contains a curative which would also cure the fluoroelastomer, it is further believed that the silane could be omitted from the fluoroelastomer which, in turn, would be cured by the prepreg curative. Adhesion should still be excellent so long as no metallic oxides were present.

Based upon the preceding results, effective amounts of the silanes were established as follows: for the amino silane, 0.1 to 3.0 phr; for the epoxy silane, 0.5 to 5.0 phr.

To demonstrate operation of the present invention under the second method, the next two examples were conducted by utilizing the silane primer-fluoroelastomer topcoat system. 20% by weight solutions of the silane and fluoroelastomer in MEK were again employed. The fluoroelastomer topcoat solution was prepared by combining 85 parts of Viton B; 15 parts of carbon black as a filler; and 500 parts of MEK.

For Examples 10 and 11, one side of two glass slides was given a coating of the Z-6020 and Z-6040 silane solution, respectively. These coatings were then air dried to remove the solvent following which each of the slides was then dipped into the fluoroelastomer solution, the uncoated sides receiving only the topcoat. The topcoat was then air dried and put into an oven for 15 minutes at 149° C. The fluoroelastomer films were then examined and it was observed that the film coating on the untreated side of glass was readily peelable, evidencing poor adhesion. The coating over the amino silane coat (Z-6020) could only be peeled away with great difficulty, while the epoxy silane (Z-6040) provided a marginal improvement in adhesion.

Controls A and B have demonstrated that cured films containing metallic oxides do not adhere well to various substrates. Although the presence of silanes in the compositions of the present invention has provided cured fluoroelastomer films having good to excellent adhesion, their addition to fluoroelastomers also containing metallic oxides does not improve adhesion. Inasmuch as silanes are known as coupling agents, the fact that they cannot improve adhesion between the fluoroelastomers and various substrates is perhaps unexpected.

In order to demonstrate the effect of metallic oxides three more films were cast: one, a Control B film; Example 12, a Control B film containing one-half part of Z-6020; and Example 13, a composition comprising 100 parts Viton B; 15 parts Mag Y (metallic oxide); one part of Z-6020 and 460 parts MEK. All films were cast on aluminum and baked for one hour at 160° C. Each readily peeled away from the aluminum dish. Thus, the presence of a silane compound in a fluoroelastomer composition containing metallic oxides does not improve adhesion.

As has been principally demonstrated herein, curing a conventional fluoroelastomer compound with a silane and in the absence of metallic oxides provides films which have an unexpected increase in adhesion properties for various substrates. By employing the methods of the present invention, it will be possible to coat cheaper substrate materials providing a fluoroelastomer exterior whereas heretofore only solid fluoroelastomer articles have been available. In other instances, substrates that are not necessarily inexpensive can be given a coating of the fluoroelastomer film in order to protect them from conditions such as oxidation, attack by chemical solvents and environments and protection from heat, to name a few.

The fluoroelastomer film compositions resulting from the method set forth herein are also believed to be novel, the films being unlike existing films which have contained metallic oxides and have not adhered well to any substrates.

Lastly, the present invention will provide a plurality of novel useful articles which bear a coating or envelope of fluoroelastomer film. Many of these articles without the coating have had utility before, however, in certain environments their life has either been shortened or not possible. Many types of tubing or hose as well as ductwork could be coated to provide chemical resistance. Larger vessels such as tanks could also be coated. Still other uses to which the fluoroelastomer coatings of the present invention could be put include pump diaphragms; O-ring cord stock; gaskets, fabricated seals and expansion joints; coated fabrics for small uses as in safety apparel to others as large as tents or buildings; foams, such as reticulated urethanes to be placed in fuel tanks, or others to be used as chemical filters; various electrical purposes such as transformers, conductive films, solar panels and appliances; heat shields; printing blankets, cable and wire coatings and even as adhesives. In addition to those substrates employed in the specification, other substrates that could be coated include other metals, numerous fabrics, other polymers, both plastic and rubber, foam materials, paper, cardboard, wood, asbestos board and cork. More generally, substantially any surface that can tolerate a thin coating can be protected by the fluoroelastomer compositions of the present invention.

Based upon the foregoing results, it is believed that the methods, compositions and coated articles of the present invention accomplish the objects set forth hereinabove. By employing solvent systems of the fluoroelastomer gum and a silane compound good dense well cured films, generally impermeable to chemical attack, and forming a strong bond with underlying substrates can be obtained.

It is to be understood that the specific composition of fluoroelastomer gum selected is not necessarily critical to meeting the objects of the present invention. It should be apparent to those skilled in the art that other fluoroelastomers could be utilized in lieu of those exemplified and disclosed herein. Similarly, other silane compounds could also be employed. The present invention is not specifically limited to the use of the two curatives specified herein inasmuch as others are generally known and could readily be substituted without affecting practice of the invention set forth herein.

It is therefore to be understood that variations of the disclosure fall within the scope of the claimed invention and that the subject invention is not to be limited by the examples set forth herein. They have been provided merely to provide a demonstration of operability and therefore the selection of suitable fluoroelastomers and silane compounds can be determined without departing from the spirit of the invention herein disclosed and described. Moreover, the scope of the invention shall include all modifications and variations that fall within the scope of the attached claims.

I claim:

1. A method for preparing fluoroelastomer film composition solutions including the steps of:
    dissolving a fluoroelastomer gum in a solvent; and
    adding a silane compound to said gum solution said silane compound having the formula $RCH_2CH_2CH_2SiR'_{3-n}(OR'')_n$, where R is an organofunctional group selected from the group consisting of amine and epoxy molecules; $R'$ is a simple alkyl group having about one to five carbon atoms; $OR''$ is a hydrolyzable alkoxy group, $R''$ being an alkyl group having about one to four carbon atoms and n is 1, 2 or 3; with the proviso that said fluoroelastomer gum and -silane solution be devoid of metallic oxide.

2. A method for adhering fluoroelastomer film compositions, devoid of metallic oxides, to substrates comprising the steps of:
    dissolving a fluoroelastomer gum in a solvent; and
    adding a silane compound to said gum solution said silane compound having the formula $RCH_2CH_2CH_2SiR'_{3-n}(OR'')_n$, where R is an organofunctional group selected from the group consisting of amine and epoxy molecules; $R'$ is a simple alkyl group having about one to five carbon atoms; $OR''$ is a hydrolyzable alkoxy group, $R''$ being an alkyl group having about one to four carbon atoms and n is 1, 2 or 3;
    coating said substrate with said fluoroelastomer gum-silane solution; and
    evaporating said solvent and leaving a film firmly adhered to said substrate.

3. A method, as set forth in claims 1 or 2, wherein said silane compound is $H_2N(CH_2)_2HN(CH_2)_3Si(OCH_3)_3$.

4. A method, as set forth in claims 1 or 2, wherein said silane compound is

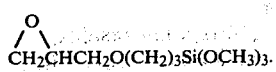

5. A method, as set forth in claims 1 or 2, wherein the amount of silane compound employed ranges from about 0.1 to about 10 parts per 100 parts of rubber.

6. A novel fluoroelastomer film composition comprising:
a fluoroelastomer gum; and
a silane compound having the formula $RCH_2CH_2CH_2SiR'_{3-n}(OR'')_n$, where R is an organofunctional group selected from the group consisting of amine and epoxy molecules; R' is a simple alkyl group having about one to five carbon atoms; OR" is a hydrolyzable alkoxy group, R" being an alkyl group having about one to four carbon atoms and n is 1, 2 or 3.

7. A novel fluoroelastomer film composition, as set forth in claim 6, wherein said silane compound is $H_2N(CH_2)_2HN(CH_2)_3Si(OCH_3)_3$.

8. A novel fluoroelastomer film composition, as set forth in claim 6, wherein said silane compound is

9. A novel fluoroelastomer film composition, as set forth in claim 6, wherein the amount of silane compound employed ranges from about 0.1 to about 10 parts per 100 parts of fluoroelastomer.

10. A novel fluoroelastomer solution comprising:
a fluoroelastomer gum;
a silane compound having the formula $RCH_2CH_2CH_2SiR'_{3-n}(OR'')_n$, where R is an organofunctional group selected from the group consisting of amine and epoxy molecules; R' is a simple alkyl group having about one to five carbon atoms; OR" is a hydrolyzable alkoxy group, R" being an alkyl group having about one to four carbon atoms and n is 1, 2 or 3; and
a solvent for said fluoroelastomer and gum solution.

11. A novel fluoroelastomer solution, as set forth in claim 10, wherein said silane compound is $H_2N(CH_2)_2HN(CH_2)_3Si(OCH_3)_3$.

12. A novel fluoroelastomer solution, as set forth in claim 10, wherein said silane compound is

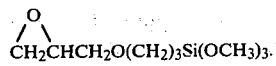

13. A novel fluoroelastomer solution, as set forth in claim 10, wherein the amount of silane compound employed ranges from about 0.1 to about 10 parts per 100 parts of fluoroelastomer.

* * * * *